C. GILBERT.
Sheep-Protector.

No. 211,726. Patented Jan. 28, 1879.

WITNESSES:
Henry N. Miller
C. Sedgwick

INVENTOR:
C. Gilbert
BY Munn & Co
ATTORNEYS.

UNITED STATES PATENT OFFICE.

CEPHAS GILBERT, OF BUCKSVILLE, ASSIGNOR TO HIMSELF AND THOMAS W. BEATY, OF CONWAYBOROUGH, SOUTH CAROLINA.

IMPROVEMENT IN SHEEP-PROTECTORS.

Specification forming part of Letters Patent No. 211,726, dated January 28, 1879; application filed July 31, 1878.

*To all whom it may concern:*

Be it known that I, CEPHAS GILBERT, of Bucksville, in the county of Horry and State of South Carolina, have invented a new and Improved Sheep-Protector, of which the following is a specification:

My invention relates to an improvement on the sheep-protector described in my application for Letters Patent filed May 7, 1878. In said invention the ends of the collar lap over each other at the portion which is nearest the throat of the animal when in place, and immediately over the cross-pieces, and the collar is fastened by the engagement of a button or stud with a button-hole-shaped slot.

The present invention consists, essentially, in arranging the fastening button and slot so as to lie on one side of the neck of the animal when in place, in order to be more easily accessible when removing or replacing it; and, further, in a novel construction and arrangement of a latch or locking device for preventing the accidental displacement of the collar.

The accompanying drawings represent a collar embodying my improvements.

Figure 1:
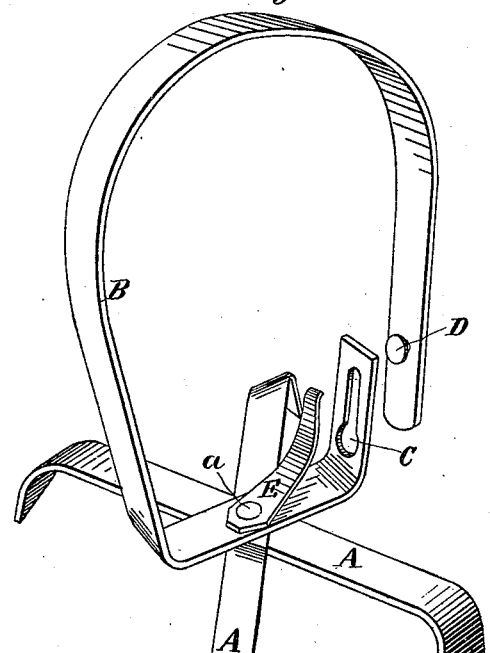
Figure 2:
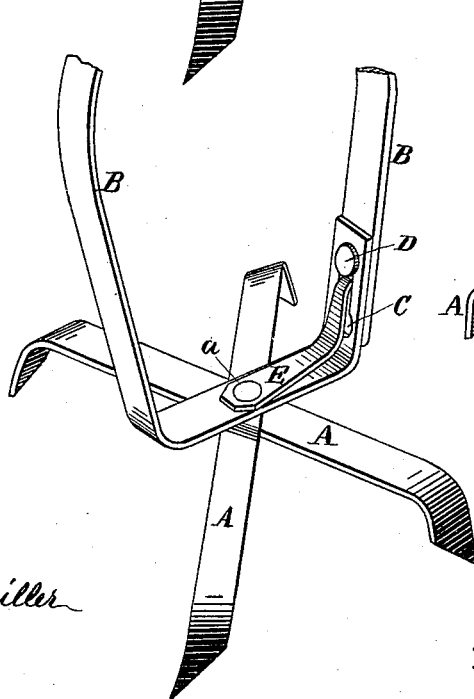
Figure 3:
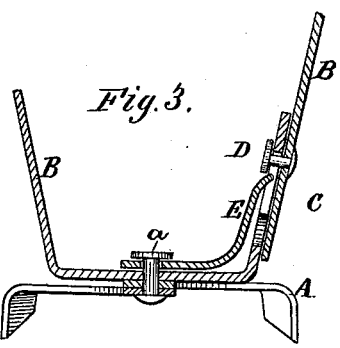

Figure 1 represents a perspective view, showing the collar unfastened and in position for placing it on the animal. Fig. 2 is a similar view, showing the collar fastened and locked. Fig. 3 is a central longitudinal section of the lower portion of the collar.

Similar letters of reference indicate corresponding parts.

A A represent the cross-pieces, which are of similar form to those shown in my application aforesaid, their ends being pointed and turned outward. They are attached to the collar by a diamond-shaped rivet, *a*, midway of the portion which lies next to the throat of the animal. Each of the cross-pieces is slightly bent or recessed at the point of junction, in order to prevent them from being displaced or pressed more closely toward each other.

The collar B is made of a strip of metal bent in the form shown in the former invention. One end of the strip is continued beyond the throat portion, and is turned up so as to lie at one side of the neck of the animal when in place. In this turned-up portion is formed the button-hole-shaped slot C. The other end of the strip is continued beyond the slotted end, so as to lap over the same, and is provided with a stud or button, D, similar to the one shown in the former invention. The two ends are coupled by inserting the head of the stud or button D in the round portion of the slot C, and then slipping it up in the straight portion of said slot as far as the upper end thereof.

The rivet *a* serves as the pivot for a swinging spring-latch or locking device, consisting of a metallic strip or tongue, E, through one end of which said pivot *a* passes, and the other end of which is narrowed, and is slightly curved inward, so as to enable it to spring into the slot C.

When the two ends of the collar are coupled together by the engagement of the button D and slot C the latch E is swung around, so as to cause its free end to spring into the slot C immediately below the button D, as shown in Figs. 2 and 3, and prevent said button from being moved downward in said slot, and consequently prevent the collar from being uncoupled until said latch is disengaged from said slot.

By this means I produce a simple, safe, and sure locking device for the collar, and one which can readily be manipulated by hand without the use of pinchers or other tools, as the latch can easily be moved into or out of place by passing the thumb and fingers between the collar and the neck of the animal.

Having thus fully described my invention, I claim as new and desire to secure by Letters Patent—

The pivoted swinging latch or locking device E, in combination with the collar B, having slot C and button D, substantially as and for the purpose shown and described.

CEPHAS GILBERT.

Witnesses:
C. P. QUATTLEBAUM,
F. I. SESSIONS.